(12) United States Patent
Dehaan et al.

(10) Patent No.: US 7,227,345 B1
(45) Date of Patent: Jun. 5, 2007

(54) FIBRE CHANNEL CABLE LOCATOR

(75) Inventors: David F. Dehaan, Tucson, AZ (US); Louie A. Dickens, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/457,367

(22) Filed: Jul. 13, 2006

(51) Int. Cl.
G01R 19/00 (2006.01)
G08B 5/22 (2006.01)

(52) U.S. Cl. .................................. 324/66; 340/825.49
(58) Field of Classification Search .................. 324/66, 324/326, 538, 539, 76.83; 340/825.49, 825.36, 340/854.1; 702/36, 58, 59
See application file for complete search history.

(56) References Cited

U.S. PATENT DOCUMENTS

| | | | | |
|---|---|---|---|---|
| 4,698,585 A | * | 10/1987 | Herman et al. | 324/66 |
| 4,916,444 A | * | 4/1990 | King | 340/825.49 |
| 5,296,850 A | * | 3/1994 | King | 340/825.49 |
| 5,353,367 A | * | 10/1994 | Czosnowski et al. | 385/135 |
| 5,666,453 A | * | 9/1997 | Dannenmann | 385/101 |
| 5,764,043 A | * | 6/1998 | Czosnowski et al. | 324/66 |
| 5,801,953 A | | 9/1998 | Thoma et al. | |
| 6,002,331 A | * | 12/1999 | Laor | 340/539.1 |
| 6,483,320 B1 | | 11/2002 | Makita et al. | |
| 2006/0253744 A1 | * | 11/2006 | Mayes et al. | 714/43 |

FOREIGN PATENT DOCUMENTS

CA 2116164 2/1994

* cited by examiner

Primary Examiner—Andrew H. Hirshfeld
Assistant Examiner—Hoai-An D. Nguyen
(74) Attorney, Agent, or Firm—Cardinal Law Group

(57) ABSTRACT

A fibre channel cable locator for locating an unidentified plugged end of a fibre channel cable within a fibre channel SAN at a location of an identified unplugged end of the fibre channel cable. In operation, the fibre channel cable locator determines the identified unplugged end of the fibre channel cable is connected to the fibre channel cable locator, logs into the fibre channel SAN device connected to the unidentified plugged end of the fibre channel cable based on the connection of the identified unplugged end of the fibre channel cable to the fibre channel cable locator, and queries the fibre channel SAN device via the login for SAN device identification information indicative of a location of the fibre channel SAN device win the fibre channel SAN.

21 Claims, 3 Drawing Sheets

US 7,227,345 B1

FIBRE CHANNEL CABLE LOCATOR

FIELD OF THE INVENTION

The present invention generally relates to a fibre channel storage area network ("SAN") employing a number of fibre channel switches which are connected together to form a fabric. The present invention specifically relates to a technique for locating where a fibre channel cable is plugged into the fibre channel SAN, particularly the fabric of the fibre channel SAN.

BACKGROUND OF THE INVENTION

FIG. 1 illustrates a fibre channel SAN environment employing ten (10) host devices 10-19, ten (10) storage devices 20-29, and a fibre channel SAN fabric 30 including four (4) fibre switches 31-35. Each host device 10-19 is plugged into fibre switch 31 via a fibre channel cable, each host device 15-19 is plugged into fibre switch 32 via a fibre channel cable, each storage device 20-24 is plugged into fibre switch 33 via a fibre channel cable, and each storage device 25-29 is plugged into fibre switch 34 via a fibre channel cable. However, each fibre switch 31-34 has a fibre channel cable 35-38, respectively, with one end plugged ("PE") into the fibre switch 31-34 and the other end unplugged ("UE") into any device. Currently, upon a network personnel identifying an unplugged end of a fibre channel cable, the only way for the network personnel to identify a location of the plugged end of the fibre channel cable within the fibre channel SAN, particularly fabric 30, is to physically ace the fibre channel cable until the plugged end is located within the fibre channel SAN, particularly fabric 30. Physically tracing the fibre channel cable can be impractical in terms of time and cost, particularly in a fibre channel SAN environment that is larger and more complex than the fibre channel SAN environment shown in FIG. 1.

SUMMARY OF THE INVENTION

The present invention provides a new and unique fibre channel cable locator implementing a method for locating an unidentified plugged end of the fibre channel cable within a fibre channel SAN at a location of an identified unplugged end of the fibre channel cable.

One form of the present invention is a computer readable medium tangibly embodying a program of machine-readable instructions executable by a processor to perform operations for locating an unidentified plugged end of a fibre channel cable within a fibre channel SAN at a location of an identified unplugged end of the fibre channel cable. The operations comprise determining the identified unplugged end of the fibre channel cable is connected to a fibre channel cable locator, logging the fibre channel cable locator into a fibre channel SAN device connected to the unidentified plugged end of the fibre channel cable based on the connection of the identified unplugged end of the fibre channel cable to the fibre channel cable locator, and querying the fibre channel SAN device via the login for SAN device identification information indicative of a location of the fibre channel SAN device within the fibre channel SAN.

A second form of the present invention is a fibre channel cable locator comprising a processor, and a memory storing instructions operable with the processor for locating an unidentified plugged end of a fibre channel cable within a fibre channel SAN at a location of an identified unplugged end of the fibre channel cable. The instructions are executed for determining the identified unplugged end of the fibre channel cable is connected to a fibre channel cable locator, for logging the fibre channel cable locator into a fibre channel SAN device connected to the unidentified plugged end of the fibre channel cable based on the connection of the identified unplugged end of the fibre channel cable to the fibre channel cable locator, and for querying the fibre channel SAN device via the login for SAN device identification information indicative of a location of the fibre channel SAN device within the fibre channel SAN.

A third form of the present invention is a method of operating a fibre channel cable locator for locating an unidentified plugged end of a fibre channel cable within a fibre channel SAN at a location of an identified unplugged end of the fibre channel cable. The method involves a determination of the identified unplugged end of the fibre channel cable being connected to the fibre channel cable locator, a logging in of the fibre channel cable locator into a fibre channel SAN device connected to the unidentified plugged end of the fibre channel cable based on the connection of the identified unplugged end of the fibre channel cable to the fibre channel cable locator, and a querying by the fibre channel cable locator of the fibre channel SAN device via the login for SAN device identification information indicative of a location of the fibre channel SAN device within the fibre channel SAN.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

Figure 1:
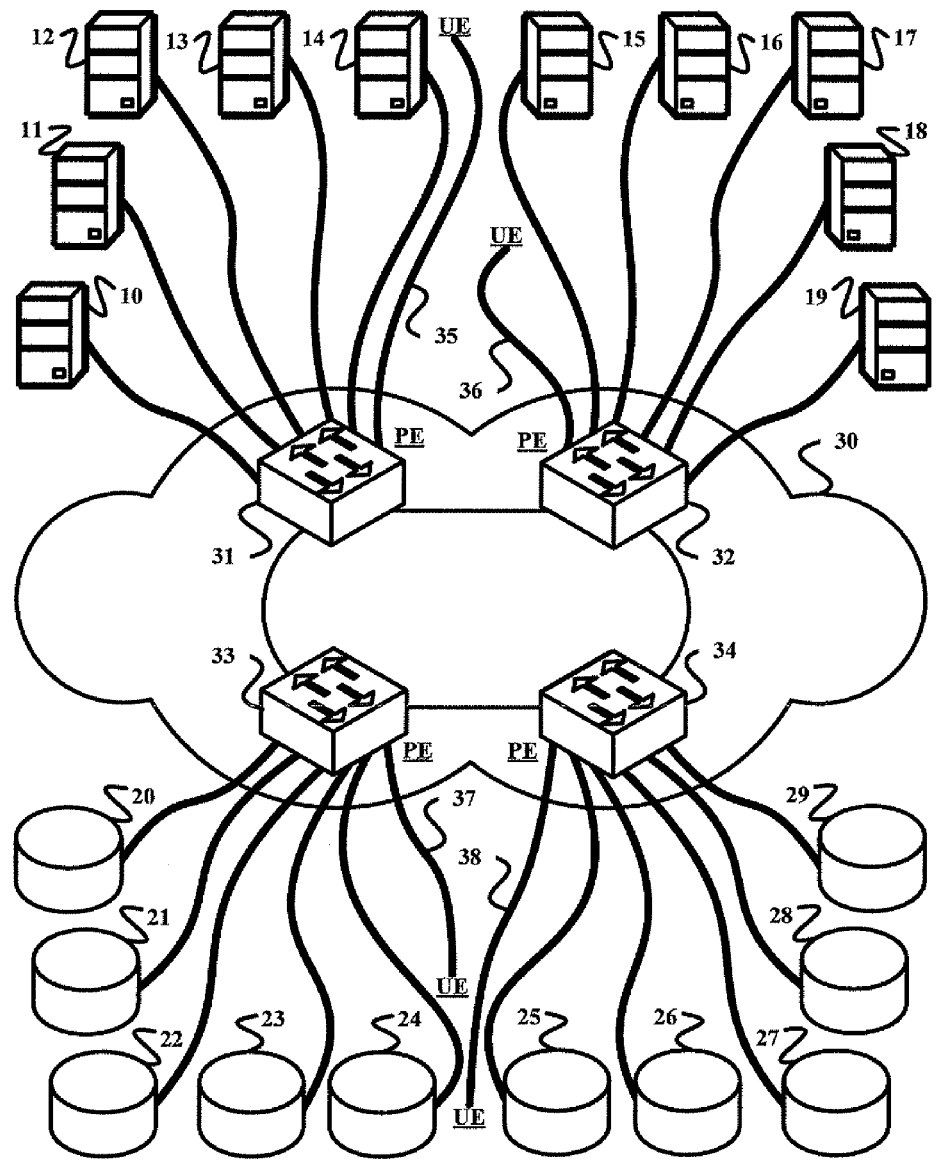
FIG. 1 illustrates one embodiment of a fibre channel SAN environment as known in the art.
Figure 2:
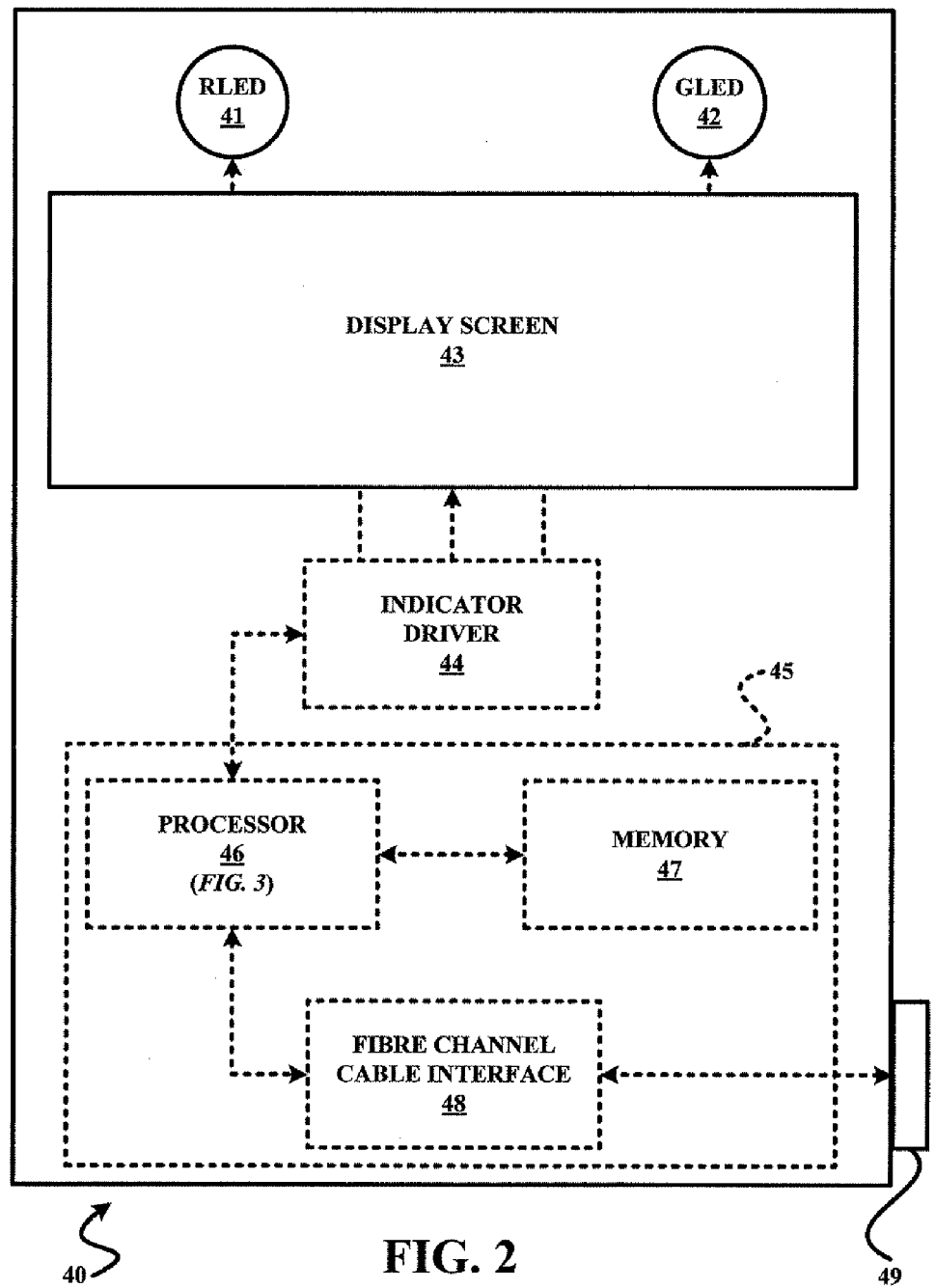
FIG. 2 illustrates one embodiment of a fibre channel cable locator in accordance with the present invention.

FIG. 2 illustrates a fibre channel cable locator 40 of the present invention employing a red light emitting diode ("RLED") 41, a green light emitting diode ("GLED") 42, a display screen 43, an indicator driver 44, and a fibre channel chip 45 having a processor 46, a memory 47 and a fibre channel cable interface 48. Also included is a fibre channel cable connector 49. Not shown for purposes of clarity of fibre channel chip 45 is a keypad or the like as would be appreciated by those having ordinary skill in the art.

Figure 3:
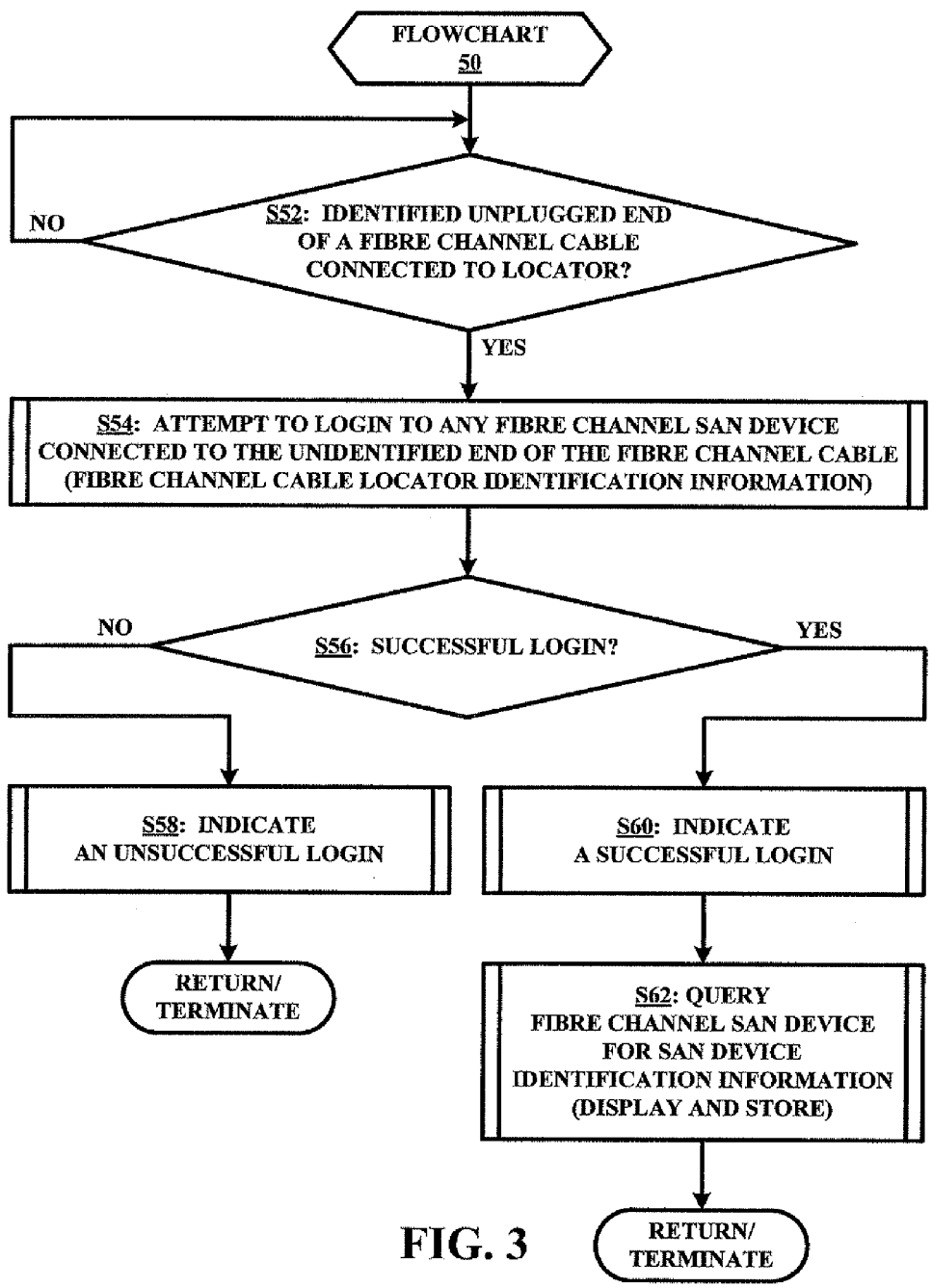
FIG. 3 illustrates a flowchart representative of one embodiment of a fibre channel cable location method in accordance with the present invention.

In operation, processor 46 execute instructions stored in memory 47 for locating an unidentified plugged end of a fibre channel cable within a fibre channel SAN at a location of an identified unplugged end of the fibre channel cable as represented by a flowchart 50 shown in FIG. 3. For purposes of the present invention, the term "identified unplugged end" of a fibre channel cable is broadly defined as an end of the fibre channel cable that has been identified by a use of locator 40 as not being connected to any device of the subject fibre channel SAN, and the term "unidentified plugged end" of a fibre channel cable is broadly defined as an end of the fibre channel cable that has not been identified by a use of locator 40 as being connected or unconnected to any device of the subject fibre channel SAN, but is assumed by the user of locator 40 to be more than likely connected to a device of the subject fibre channel SAN.

Referring to FIG. 3, upon a powering ON of locator 40, a stage S52 of flowchart 50 encompasses processor 46 determining whether an identified unplugged end of the fibre channel cable has been connected to locator 40 via connector 49. If so, then processor 46 proceeds to stage S54 of flowchart 50 to attempt to login upon command to any fibre channel SAN device connected to the unidentified plugged end of the fibre channel cable. In one embodiment, processor 46 communicates fibre channel cable locator identification information for identifying locator 40 as an authorized and distinct source of the login, such as, for example, a distinguishable world wide name of any type associated with locator 40 (e.g., of 1111111111111111).

If processor 46 determines during a stage S56 of flowchart 50 that the login was unsuccessful for any reason (e.g., unidentified unplugged end of the fibre channel cable is not connected to a device of the subject fibre channel SAN, or the fibre channel cable is inoperable), then processor 46 proceeds to a stage S58 of flowchart 50 to command driver 44 to indicate the unsuccessful login to the user of locator 40 via a display of an unsuccessful login message on display screen 43 and/or a lighting of red light emitting diode 41.

If processor 46 determines during stage S56 of flowchart 50 that the login was successful, then processor 46 proceeds to a stage S60 of flowchart 50 to command driver 44 to indicate the successful login to the user of locator 40 via a display of an successful login message on display screen 43 and/or a lighting of green light emitting diode 42. Thereafter, processor 46 proceeds to a stage S62 of flowchart 50 to query the fibre channel SAN device via the login for SAN device identification information indicative of a location of the fibre channel SAN device within the fibre channel SAN.

In one embodiment, the SAN device identification information includes a world wide name of any type. Specifically, in the case where the fibre channel SAN device is a switch, the SAN device identification information includes a world wide port name associated with the switch whereby processor 46 stores the world wide port name in memory 47 and commands driver 44 to display the world wide port name on display screen 43 for the user of locator 40. In the case where the fibre channel SAN device is a node (e.g., a host device or a storage device), the SAN device identification information includes a world wide node name associated with the node whereby processor 46 stores the world wide node name in memory 47 and commands driver 44 to display the world wide node name on display screen 43 for the user of locator 40.

From the display of the SAN device identification information on locator 40, the user of locator 40 will be capable to identify the location of plugged end of the fibre channel cable within the fibre channel SAN at the lotion of the unplugged end of the fibre channel cable. Additionally, if the world wide name of locator 40 was communicated during the login, then an administrator of the fibre channel SAN will be capable of identifying the location of the plugged end of the fibre channel cable within the fibre channel SAN by searching the fibre channel SAN for the world wide name of locator 40 during or after the login. Alternatively or concurrently, subsequent to an initial display of the SAN device identification information, processor 46 can log locator 40 in and out of the fibre channel SAN device as indicated by a flashing of the green light emitting diode 42 whereby the an administrator of the fibre channel SAN will be capable of identifying the location of the plugged end of the fibre channel cable within the fibre channel SAN by searching the fibre channel SAN for flashing login of locator 40.

From the storage of the SAN device identification information in locator 40, the user of locator 40 or another network personnel will be able to download the SAN device identification information within the fibre channel SAN whereby the user of locator 40 or the other network personnel will be capable to identify and/or confirm the location of plugged end of the fibre channel cable within the fibre channel SAN at the location of the unplugged end of the fibre channel cable.

Referring to FIGS. 2 and 3, those having ordinary skill in the art will appreciate various benefits and advantages of the present invention, including, but not limited to, a practical technique for locating an unidentified plugged end of a fibre channel cable within a fibre channel SAN.

The term "processor" as used herein is broadly defined as one or more processing units of any type for performing all arithmetic and logical operations and for decoding and executing all instructions related to facilitating an implementation by a fibre channel cable locator of the various methods of the present invention. Additionally, the term "memory" as used herein is broadly defined as encompassing all storage space in the form of signal readable mediums of any type within a fibre channel cable locator.

Furthermore, those having ordinary skill in the art of fibre channel cable location techniques may develop other embodiments of the present invention in view of the inventive principles of the present invention described herein. Thus, the terms and expression which have been employed in the foregoing specification are used herein as terms of description and not of limitations, and there is no intention in the use of such terms and expressions of excluding equivalents of the features shown and described or portions thereof, it being recognized that the scope of the present invention is defined and limited only by the claims which follow.

We claim:

1. A computer medium tangibly embodying a program of machine-readable instructions executable by a processor to perform operations for locating an unidentified plugged end of a fibre channel cable within a fibre channel SAN at a location of an identified unplugged end of the fibre channel cable, the operations comprising: determining the identified unplugged end of the fibre channel cable is connected to a fibre channel cable locator;

logging the fibre channel cable locator into a fibre channel SAN device connected to the unidentified plugged end of the fibre channel cable based on the connection of the identified unplugged end of the fibre channel cable to the fibre channel cable locator; and querying the fibre channel SAN device via the login for SAN device identification information indicative of a location of the fibre channel SAN device within the fibre channel SAN.

2. The computer medium of claim 1, wherein the fibre channel SAN device is a switch; and wherein the SAN device identification information includes a world wide port name associated with the switch.

3. The computer medium of claim 1, wherein the fibre channel SAN device is a node; and wherein the SAN device identification information includes a world wide node name of the fibre channel SAN device.

4. The computer medium of claim 1, further comprising: displaying the SAN device identification information on the fibre channel cable locator.

5. The computer medium of claim 1, further comprising: storing the SAN device identification information in the fibre channel cable locator.

6. The computer medium of claim 1, wherein the logging of the fibre channel cable locator into the fibre channel SAN device includes:
communicating fibre channel cable locator identification information indicative of an authorized and distinct login of the fibre channel cable locator to the fibre channel SAN device.

7. The computer medium of claim 6, wherein the fibre channel cable locator identification information includes a world wide name associated with the fibre channel cable locator.

8. A fibre channel cable locator, comprising:
a processor; and
a memory storing instructions operable with the processor for locating an unidentified plugged end of a fibre channel cable within a fibre channel SAN at a location of an identified unplugged end of the fibre channel cable, wherein the instructions are executed for:
determining the identified unplugged end of the fibre channel cable is connected to a fibre channel cable locator;
logging the fibre channel cable locator into a fibre channel SAN device connected to the unidentified plugged end of the fibre channel cable based on the connection of the identified unplugged end of the fibre channel cable to the fibre channel cable locator; and
querying the fibre channel SAN device via the login for SAN device identification information indicative of a location of the fibre channel SAN device within the fibre channel SAN.

9. The fibre channel cable locator of claim 8,
wherein the fibre channel SAN device is a switch; and
wherein the SAN device identification information includes a world wide port name associated with the switch.

10. The fibre channel cable locator of claim 8,
wherein the fibre channel SAN device is a node; and
wherein the SAN device identification information includes a world wide node name of the fibre channel SAN device.

11. The fibre channel cable locator of claim 8, wherein the instructions are further executed for:
displaying the SAN device identification information on the fibre channel cable locator.

12. The fibre channel cable locator of claim 8, wherein the instructions are further executed for:
storing the SAN device identification information in the fibre channel cable locator.

13. The fibre channel cable locator of claim 8, wherein the logging of the fibre channel cable locator into the fibre channel SAN device includes:
communicating fibre channel cable locator identification information indicative of an authorized and distinct login of the fibre channel cable locator to the fibre channel SAN device.

14. The fibre channel cable locator of claim 13, wherein the fibre channel cable locator identification information includes a world wide name associated with the fibre channel cable locator.

15. A method of operating a fibre channel cable locator for locating an unidentified plugged end of a fibre channel cable within a fibre channel SAN at a location of an identified unplugged end of the fibre channel cable, the method comprising:
determining the identified unplugged end of the fibre channel cable is connected to a fibre channel cable locator;
logging the fibre channel cable locator into a fibre channel SAN device connected to the unidentified plugged end of the fibre channel cable based on the connection of the identified unplugged end of the fibre channel cable to the fibre channel cable locator; and
querying the fibre channel SAN device via the login for SAN device identification information indicative of a location of the fibre channel SAN device within the fibre channel SAN.

16. The method of claim 15,
wherein the fibre channel SAN device is a switch; and
wherein the SAN device identification information includes a world wide port name associated with the switch.

17. The method of claim 15,
wherein the fibre channel SAN device is a node; and
wherein the SAN device identification information includes a world wide name of the fibre channel SAN device.

18. The method of claim 15, further comprising;
displaying the SAN device identification information on the fibre channel cable locator.

19. The method of claim 15, further comprising:
storing the SAN device identification information in the fibre channel cable locator.

20. The method of claim 15, wherein the logging of the fibre channel cable locator into the fibre channel SAN device includes:
communicating fibre channel cable locator identification information indicative of an authorized and distinct login of the fibre channel cable locator to the fibre channel SAN device.

21. The method of claim 15, wherein the fibre channel cable locator identification information includes a world wide name associated with the fibre channel cable locator.

* * * * *